(12) United States Patent
Cohen et al.

(10) Patent No.: US 6,741,921 B2
(45) Date of Patent: May 25, 2004

(54) MULTI-STAGE TRUCK ASSIGNMENT SYSTEM AND METHOD

(75) Inventors: Paul Joseph Cohen, Cote St-Luc (CA); Stephane Alarie, Montreal (CA); Michel Gamache, St. Lambert (CA)

(73) Assignee: Caterpillar Inc, Peoria, IL (US)

( * ) Notice: Subject to any disclaimer, the term of this patent is extended or adjusted under 35 U.S.C. 154(b) by 52 days.

(21) Appl. No.: 10/024,220

(22) Filed: Dec. 21, 2001

(65) Prior Publication Data

US 2003/0069680 A1 Apr. 10, 2003

Related U.S. Application Data

(60) Provisional application No. 60/327,013, filed on Oct. 5, 2001.

(51) Int. Cl.[7] .............................. G06F 19/00; G06F 7/70
(52) U.S. Cl. .................................. 701/50; 701/1; 705/8; 455/521
(58) Field of Search .................... 701/50, 1; 705/6, 705/8, 9; 455/507, 517, 521, 456; 342/357.17

(56) References Cited

U.S. PATENT DOCUMENTS

| | | | |
|---|---|---|---|
| 3,979,731 A | 9/1976 | Naplatanov et al. | 701/118 |
| 4,831,539 A * | 5/1989 | Hagenbuch | 701/207 |
| 5,265,006 A | 11/1993 | Asthana et al. | 705/8 |
| 5,541,848 A | 7/1996 | McCormack et al. | 700/213 |
| 5,586,030 A * | 12/1996 | Kemner et al. | 701/50 |
| 5,619,695 A | 4/1997 | Arbabi et al. | 709/100 |
| 5,623,413 A | 4/1997 | Matheson et al. | 701/117 |
| 5,774,877 A | 6/1998 | Patterson, Jr. et al. | 705/35 |
| 5,794,172 A | 8/1998 | Matheson et al. | 701/117 |
| 5,848,368 A * | 12/1998 | Allen et al. | 701/50 |
| 5,850,341 A | 12/1998 | Fournier et al. | 701/50 |
| 6,002,863 A | 12/1999 | Sheer et al. | 703/22 |
| 6,037,901 A * | 3/2000 | Devier et al. | 342/357.17 |
| 6,141,614 A * | 10/2000 | Janzen et al. | 701/50 |
| 6,154,735 A | 11/2000 | Crone | 706/45 |
| 6,240,362 B1 | 5/2001 | Gaspard, II | 701/209 |
| 6,246,932 B1 * | 6/2001 | Kageyama et al. | 701/24 |
| 6,496,775 B2 * | 12/2002 | McDonald et al. | 701/213 |
| 6,529,812 B1 * | 3/2003 | Koehrsen et al. | 701/50 |

\* cited by examiner

*Primary Examiner*—Tan Q. Nguyen
(74) *Attorney, Agent, or Firm*—Finnegan, Henderson, Farabow, Garrett & Dunner

(57) ABSTRACT

A method is provided for providing dispatch assignments to a plurality of vehicles in an environment including a plurality of sources and a plurality of processing sites. Current information about the environment is obtained, as is information about optimal criteria. Based on the current environment and the optimal criteria information, a production plan is determined. Based on the production plan and consideration of a cooperative assignment and/or anticipated future environment conditions, a dispatch assignment is selected for each vehicle.

45 Claims, 6 Drawing Sheets

MULTI-STAGE TRUCK ASSIGNMENT SYSTEM AND METHOD

CROSS REFERENCE TO RELATED APPLICATION

This application claims the benefit of U.S. Provisional No. 60/327,013, filed Oct. 5, 2001, the contents of which are herein incorporated by reference.

TECHNICAL FIELD

The present invention relates generally to dispatching systems, and more particularly, to a method and system for optimizing assignment of trucks in an open-pit mining environment.

BACKGROUND

In a number of industries, vehicles or other transportation methods are used to pick up loads from one location and deliver the loads to another location. Some exemplary industries that work within this model include shipping, package delivery, and taxi-cabs. This model has particular application in the mining industry, where material transportation involves a truck picking up a load of ore from a shovel site and transporting that ore to a processing site. Additionally, processed ore may need to be transported to a site of additional processing. Because of this, material transport is one of the most important aspects in the mining industry and can represent 50–60% of costs associated with open-pit mining.

Even a slight reduction in costs associated with material transport may result in significant savings. Thus, a dispatching system for controlling the trucks within a mine can be used to optimize material transport and reduce costs. The essence of a dispatching system is to determine, every time a truck leaves a site in the mine, where is the "best" place for that truck to go. Determining the "best" place involves optimizing one or more objectives, such as minimizing the waiting time of trucks at processing sites, maximizing the overall production of the mine, or minimizing hauling distances.

Two approaches have been used for truck dispatch systems—single-stage and multi-stage. Single-stage systems dispatch trucks according to one or several criteria. Single-stage systems, however, do not take into account any production targets or constraints. Often single-stage systems use heuristic, or non-mathematical, rules to determine the truck assignments. Multi-stage systems, on the other hand, divide dispatching problems into multiple stages. Typically, multi-stage systems include an upper stage, which consists of setting production targets for each shovel, and a lower stage, which consists of assigning trucks to shovels to minimize deviation from the production targets suggested in the upper stage. Traditionally, regardless of the approach used, truck dispatching systems have been concerned with only one truck and/or one shovel or processing site. Further, truck dispatching systems can often only consider a single goal, such as maximizing production. For example, one such system is disclosed in U.S. Pat. No. 3,979,731, entitled "Method of and System for Rationalizing the Operation of Open-Pit Mines." This system evaluates the ore to be loaded at each loading station (or shovel) and determines the number of vehicles to be routed to each station. The system takes into account production quotas, number of vehicles waiting, and the travel times associated with each available vehicle. This system, however, is not able to truly optimize material transport because it does not provide adaptable guidelines, nor does it provide for real-time decision making that permits on-the-fly changes in response to unplanned events.

In order to truly optimize material transport, multi-stage systems must be able to, in the upper stage, adapt guidelines based on the current mine environment. For example, when a mine has a shortage of trucks, it is inefficient to minimize truck idle time, because it is unlikely that a truck would be required to wait in the "under-trucked" scenario. Further, these guidelines must adapt to changes such as the breakdown of a shovel. The adaptability of guidelines must not only take into account the current state of the mine, but also be able to account for upcoming events that may change the mine environment, such as a number of broken-down shovels becoming operational.

In the lower stage, the system must be able to make real-time dispatching decisions. Further, these dispatch decisions should account for the fact that multiple trucks may cooperate, rather than each truck seeking the best decision only for itself. The lower stage should dispatch a number of trucks to follow the guidelines determined by the upper stage. The lower stage must also have some mechanisms in order to react efficiently to minor, unplanned events, that were not considered by the upper stage.

The present invention is directed to overcoming one or more of the problems or disadvantages associated with the prior art.

SUMMARY OF THE INVENTION

A system is provided for providing dispatch assignments. The system includes a plurality of vehicles, a plurality of sources, a plurality of processing sites, and a base computer. The base computer is configured to provide dispatch information to individual vehicles based upon a cooperative assignment of multiple vehicles within the plurality of vehicles.

Further, a method is provided for providing dispatch assignments to a plurality of vehicles in an environment including a plurality of sources and a plurality of processing sites. Current information about the environment is obtained, as is information about optimal criteria. Based on the current environment and the optimal criteria information, a production plan is determined. A plurality of possible dispatch assignments for each vehicle is determined based on the production plan and costs associated with each possible dispatch assignment are determined. Based upon consideration of a cooperative assignment of multiple vehicles within the plurality of vehicles, a dispatch assignment is selected for each vehicle from among the possible dispatch assignments.

A computer readable medium including instructions for performing the above method is also provided.

Further, another system is provided for providing dispatch assignments within an environment. The system includes a plurality of vehicles, a plurality of sources, a plurality of processing sites, and a base computer. The base computer is configured to provide dispatch information to the plurality of vehicles based on anticipated future environment conditions.

Another method is provided for providing dispatch assignments to a plurality of vehicles in an environment including a plurality of sources and a plurality of processing sites. Current and anticipated future information about the environment is obtained, as is information about optimal criteria. Based on the current environment and the optimal criteria information, a production plan is determined. A plurality of possible dispatch assignments for each vehicle is determined based on the production plan and costs associated with each possible dispatch assignment are determined. Based on the production plan and anticipated future environment conditions, a dispatch assignment is selected for each vehicle from among the possible dispatch assignments.

A computer readable medium including instructions for performing the above method is also provided.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
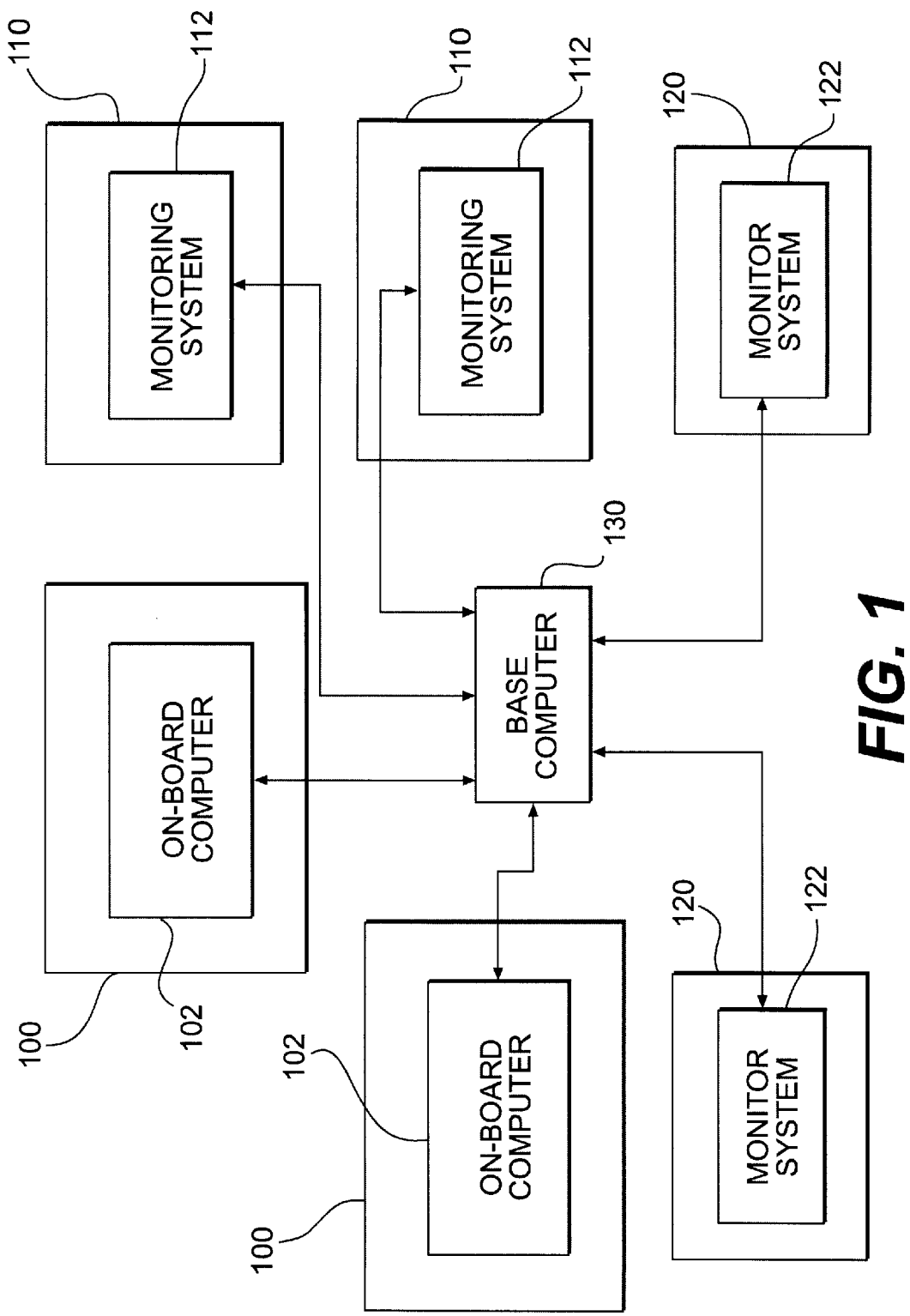
FIG. 1 is a block diagram of an exemplary truck dispatching system.

FIG. 1 illustrates a system consistent with an exemplary embodiment of the present invention. As shown diagrammatically in FIG. 1, the system includes a plurality of work machines or vehicles 100, a plurality of shovels 110, a plurality of processing sites 120, and a base computer 130. Vehicles 100 transport ore or other loads from shovels 110 to processing sites 120. Vehicle 100 may include an on-board computer. On-board computer 102 may include a display element to provide information to the vehicle operator. Information may alternatively be conveyed to the vehicle operator through other means, such as an audio message. Further, on-board computer 102 may include interactive elements, such as a keypad, to receive information from the vehicle operator. On-board computer 102 may also be equipped with a position sensing system and wireless communication capabilities. The position sensing system may include a Global Positioning System (GPS), a laser positioning system, an inertial navigation unit, or any suitable system or combination thereof. Further, on-board computer 102 may also be equipped with a vital sign monitor. The vital sign monitor may monitor travel time, detect potential mechanical failures, quantify the load of the truck, or obtain other information about the truck and its operation. Although FIG. 1 illustrates two vehicles 110, it should be understood that a system consistent with the present invention may include additional vehicles.

Shovels 110 deliver ore or other loads to vehicles 100. The term "shovels" is used broadly to encompass any piece of equipment that delivers a load to a vehicle. Each shovel 110 includes a monitoring system 112. Monitoring system 112 monitors information about the shovel, such as current level of ore available for pick-up. Monitoring system 112 may also include wireless communication capabilities. Further, monitoring system 112 may also include vital sign monitors, which may identify the type of load dug by a shovel. Although FIG. 1 illustrates two shovels 110, it should be understood that a system consistent with the present invention may include additional shovels.

Processing machines 120 receive ore or other loads from vehicles 100 for processing. For example, processing machines 120 may include crusher machines. Processing machines 120 each include a monitoring system 122. Monitoring system 122 monitors information about the processing machine, such as the current level of ore for processing. Monitoring system 122 may also include static information, such as the total capacity or processing rate of the machine. Monitoring system 122 may also include wireless communication capabilities. Although FIG. 1 illustrates two processing machines 120, it should be understood that a system consistent with the present invention may include additional processing machines.

Figure 2:
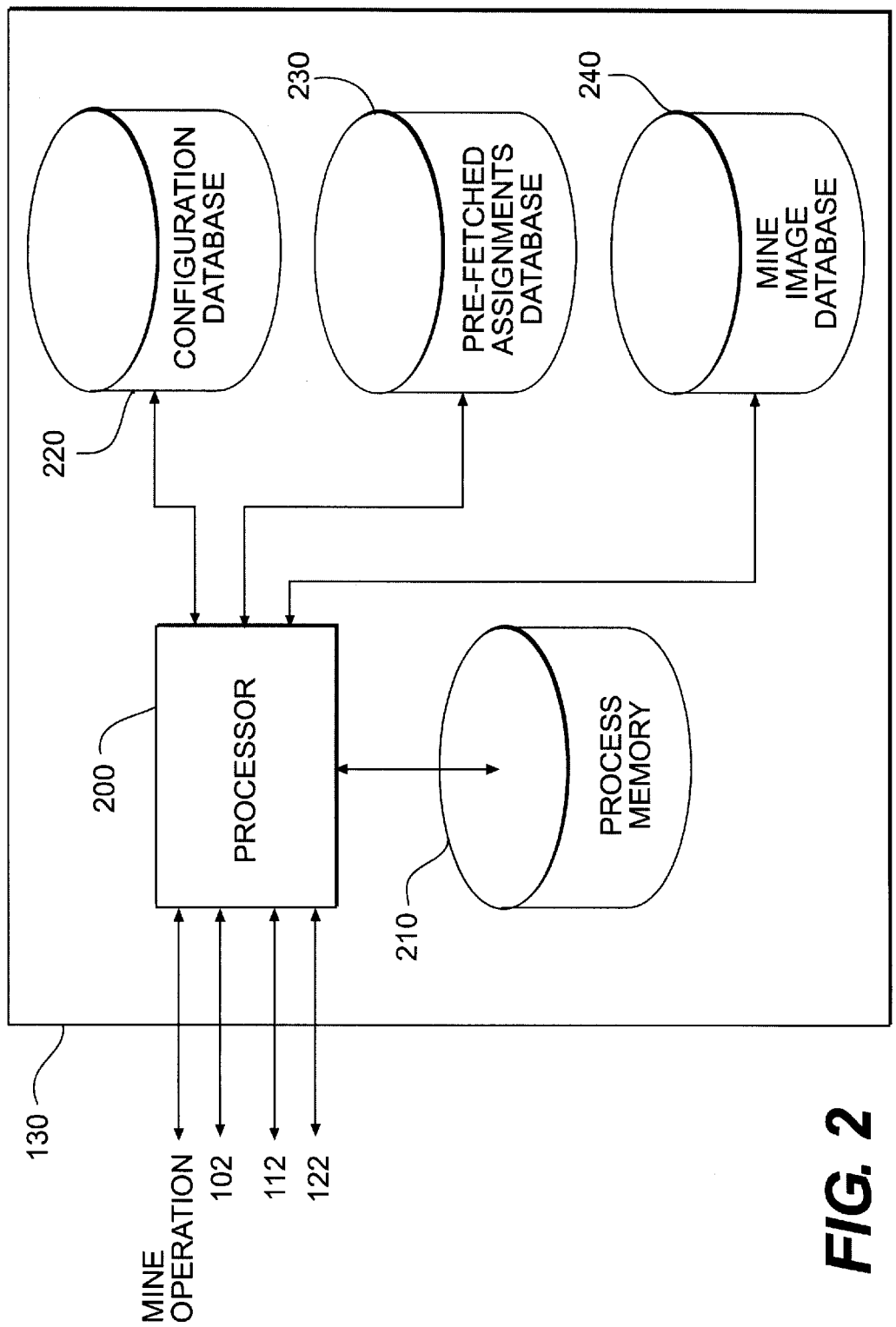
FIG. 2 is a block diagram of an exemplary base computer, consistent with one embodiment of the present invention.

Vehicles 100 are dispatched to and from shovels 110 and/or processing sites 120 via base computer 130. For example, after a vehicle 100 delivers its load to a processing site, base computer 130 may direct vehicle 100 to a specific shovel 110. FIG. 2 illustrates base computer 130 in greater detail.

As shown in FIG. 2, base computer 130 includes a processor 200, a process memory 210, a configuration database 220, a pre-fetched assignment database 230, and a mine image database 240. Processor 200 may receive information, via wireless communication, from on-board computer 102, shovel monitoring system 112 and processing site monitoring system 122. Processor 200 is connected to process memory 210. Process memory 210 includes instructions for performing a variety of processes required to optimize material transport. For example, process memory 210 may include instructions for populating the configuration database 220, retrieving information from the configuration database 220, determining default dispatch assignments, determining pre-fetch assignments, and providing assignments to vehicles 100. These processes are described in further detail with respect to FIGS. 3–7. Processor 200 is also connected to the configuration database 220, the pre-fetched assignment database 230, and the mine image database 240. Configuration database 220 includes current system settings, such as choice of optimization criterion, specifications of blending requirements, and other solution parameters. Pre-fetched assignment database 230 includes updated truck dispatch assignments, before the dispatch assignments are provided to vehicles 100. Mine image database 240 includes information about the mine, including information about each piece of equipment (such as location and current status), information about material excavated by each shovel, the current blending at each processing machine, and other relevant mine information.

On-board computer 102 and/or base computer 130 may be implemented in various environments to provide the tools for obtaining the required data and providing the data to the vehicle operator. On-board computer 102 and/or base computer 130 (and specifically processor 200) may be hardware specifically constructed for performing various processes and operations of the assignment system or may include a general purpose computer or computing platform (such as a Windows NT server) selectively activated or reconfigured by program code (such as C or C++) to provide the necessary functionality. Configuration database 220, pre-fetched assignment database 230, and mine image database 240 may each be implemented by a data storage device such as a database, a Lightweight Directory Access Protocol (LDAP) directory, or other file system.

As previously described, process memory 210 may include instructions for processes such as populating the configuration database 220, retrieving information from the configuration database 220, determining default dispatch assignments, determining pre-fetch assignments, providing assignments to vehicles 100, and related processes. These processes will now be described in detail.

Figure 3:
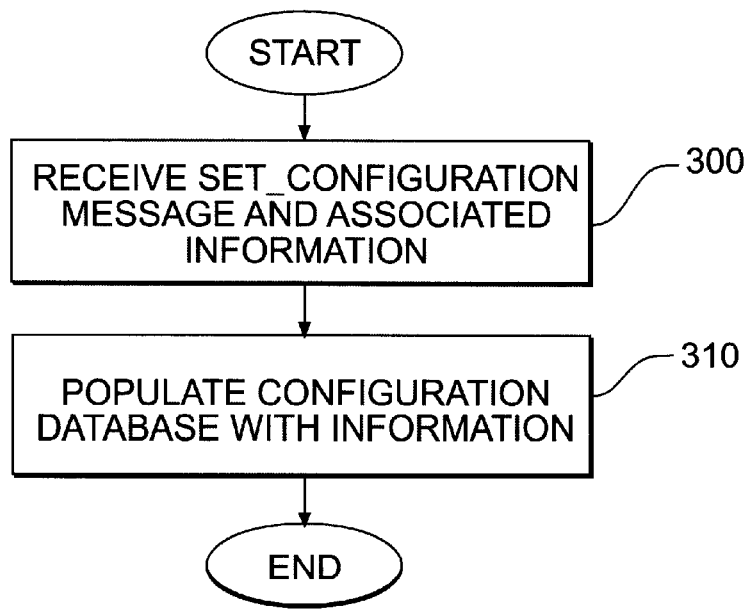
FIG. 3 is an exemplary flow chart of the "Set Configuration" process performed by the base computer, consistent with one embodiment of the present invention.

Set Configuration: This process permits mine operators to specify particular optimization criterion and other parameters for consideration in determining truck assignments. As shown in FIG. 3, processor 200 receives a Set_Configuration message from mining operations, along with associated information (step 300). Mining operations may include an interface between mine operators and the assignment system. For example, mining operations may include a centralized office where information can be exchanged between the assignment system and mine operators. The associated information may include optimization criteria, such as minimizing truck or shovel idle time, maximizing production, or achieving a target productivity or blend of ore. Associated information may also include mine image information that affects truck assignment, such as a map of haulage routes or the location of shovels and/or processing sites. (Mine image information is also routinely updated by on-board computer 102, shovel monitoring system 112, and processing site monitoring system 122.) This information is then stored in configuration database 220 and/or mine image database 240 (step 310).

Figure 4:
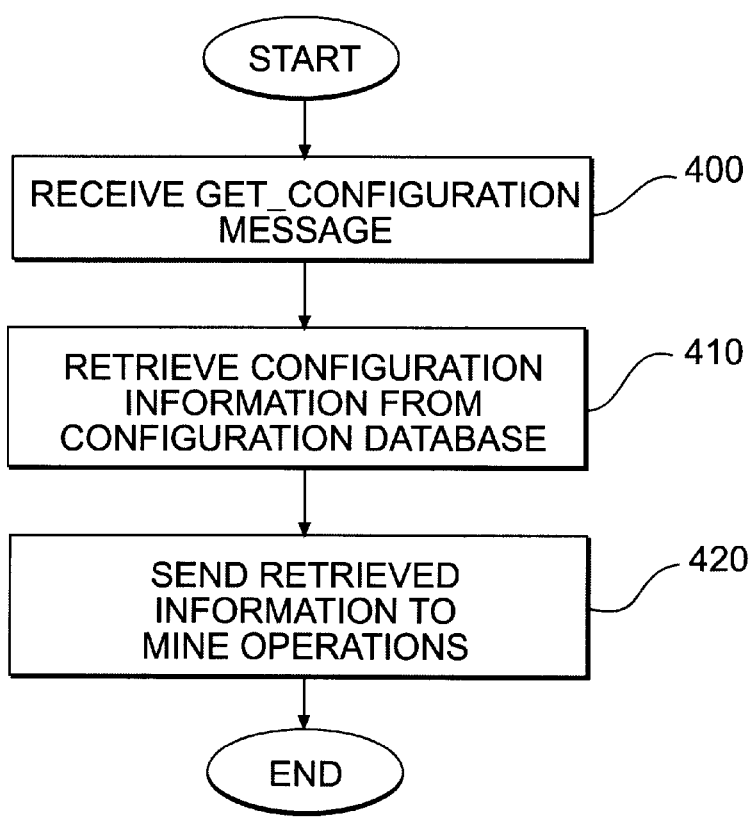
FIG. 4 is an exemplary flow chart of the "Get Configuration" process performed by the base computer, consistent with one embodiment of the present invention.

Get Configuration: This process permits mine operators to obtain the current values stored in configuration database 220. As shown in FIG. 4, processor 200 receives a Get Configuration message from mining operations (step 400). Processor 200 accesses configuration database 220 to obtain the requested information (step 410) and sends the retrieved information to mining operations (step 420).

Get Default Assignments: This process determines a fixed assignment alternative for all trucks. This fixed assignment alternative provides truck assignments, as consistent to the optimal criteria as possible, in cases where either the truck dispatching system or other mining operation systems fail. When either of these systems fail, the vehicles 100 will receive, via on-board computer 102, a fixed assignment, such as to continue picking up ore from a certain shovel and delivering ore to a certain processing site, until further dispatch instructions are received. This process is invoked occasionally to create an updated set of default assignments consistent with the current state of the mine.

Figure 5:
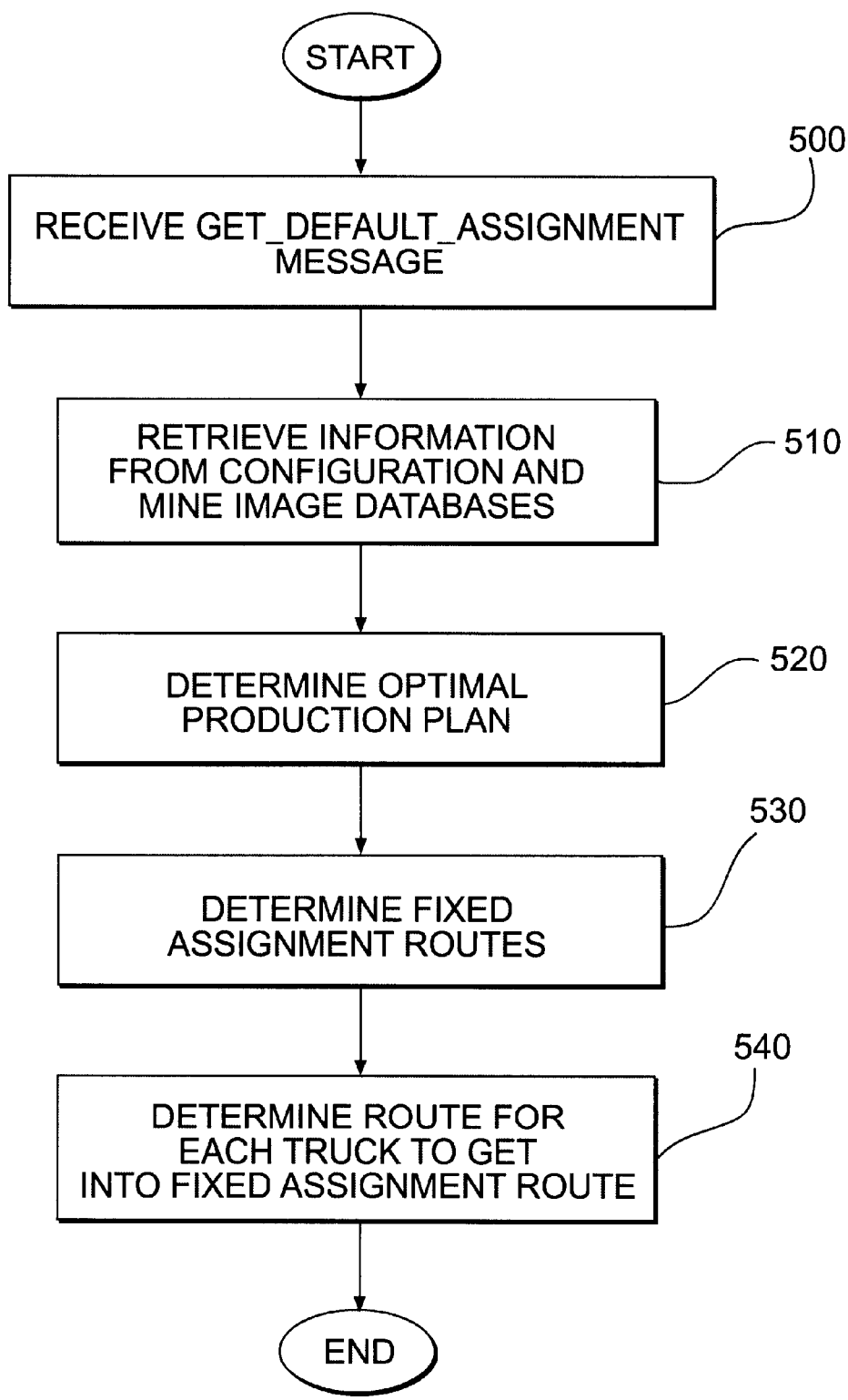
FIG. 5 is an exemplary flow chart of the "Get Default Assignment" process performed by the base computer, consistent with one embodiment of the present invention.

As shown in FIG. 5, processor 200 receives a Get_Default_Assignment message from mining operations (step 500). Processor 200 then retrieves information from configuration database 220 and mine image database 240 (step 510). This information may include the current optimization criteria, production requirements, blending requirements, and/or information about the current mining environment, such as the locations of shovels and processing sites. Using this information, an optimal production plan is determined (step 520). The optimal production plan may use a known method of problem-solving to determine the optimal material flow rates between each shovel and processing site to satisfy production requirements. Next, fixed assignment routes are determined (step 530). The fixed assignment routes may be determined by known problem-solving techniques and include routes each truck must follow in order to maximize production while satisfying production requirements. Finally, a route is determined for each truck in order to get the truck into the fixed assignment route (step 540). Each route includes instructions so that a truck can get into the fixed assignment route from any location in the field. The fixed assignment routes, as well as the routes for getting each truck into the fixed assignment routes, are sent to mining operations for storage. Should the truck assignment system fail, mining operations will forward this information to each truck.

Pre-Fetch: This process determines the optimal assignments for a set of trucks. Anticipation about how operations will evolve in the near future may be taken into account. For example, anticipated future conditions may include the forecasted time at which vehicles will arrive at their destination, based on planned interruptions of the vehicles and restrictions on road segments. Other anticipated future conditions may include the forecasted time at which a vehicle will leave a shovel or processing site based on queue management at the shovel or processing site, planned interruptions of the vehicles, shovels, or processing site, vehicle capacity of the shovel or processing sites, and the processing rates of the processing sites. Further, this process may consider not just a single truck, but a set of trucks working cooperatively. This process may be invoked at regular time intervals or when certain events occur, but preferably is invoked regularly in order to provide the best truck assignments based on the information known at the time.

Figure 6:
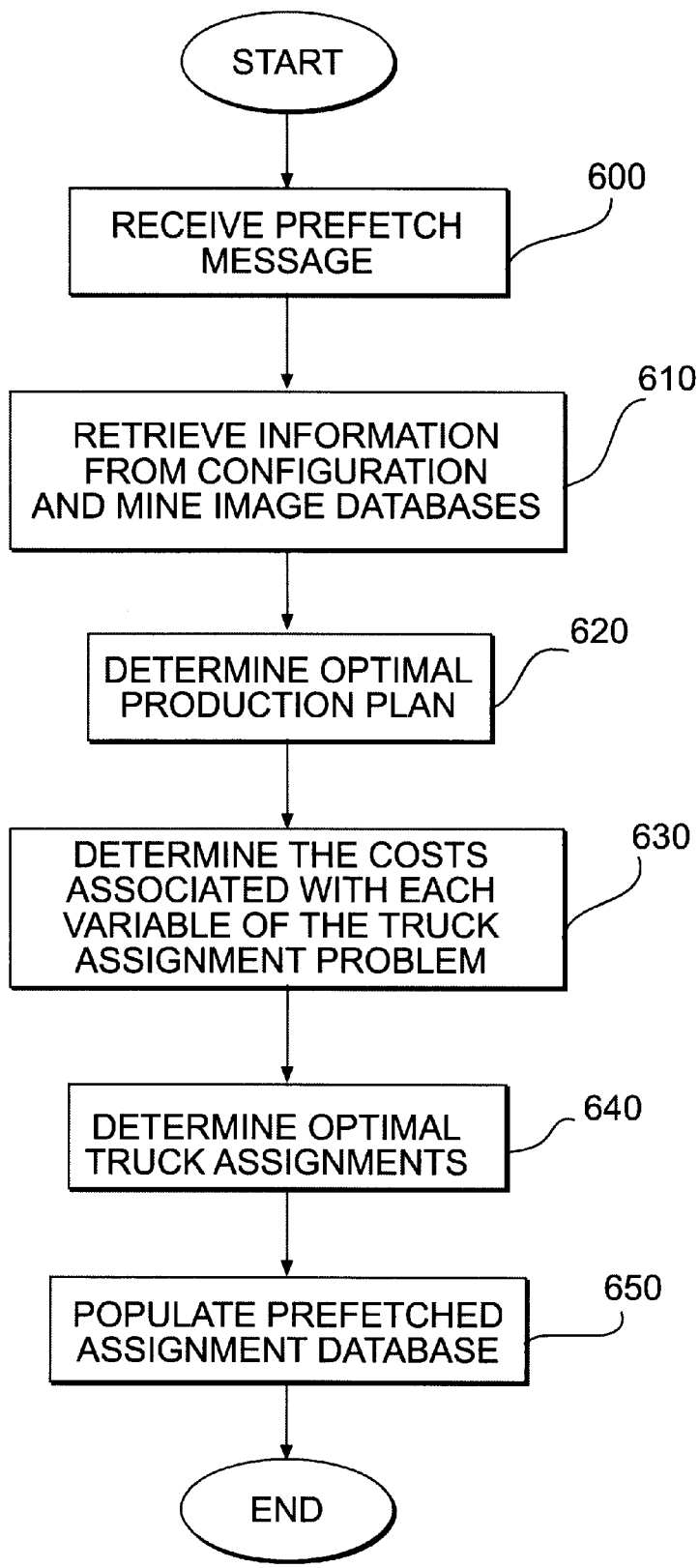
FIG. 6 is an exemplary flow chart of the "Pre-Fetch" process performed by the base computer, consistent with one embodiment of the present invention.

As shown in FIG. 6, processor 200 receives a Pre-Fetch message from mining operations (step 600). Alternatively, processor 200 may invoke the Pre-Fetch process on its own, based on some stored criteria, such as length of time elapsed since last invoked. Processor 200 then retrieves information from configuration database 220 and mine image database 240 (step 610). This information may include the current optimization criteria, production requirements, blending requirements, and/or information about the current mining environment, such as the locations of shovels and processing sites. Using this information, processor 200 determines a production plan (step 620). The production plan may use a known method of problem-solving to determine the optimal material flow rates between each shovel and processing site to satisfy production requirements. Next, processor 200 evaluates the costs associated with each variable of the truck assignment problem (step 630). Preferably, based on the information from configuration database 220, mine image database 240, and the optimal production plan, the processor uses a known problem-solving method to generate a cost associated with each possible truck assignment. Based on the cost information for each truck assignment, processor 200 determines optimal truck assignments (step 640). This determination may be made using traditional problem-solving techniques and considering the optimal production plan, production and blending requirements, and the costs associated with each assignment. Further, the determination may be made based on a consideration of cooperative assignments. Cooperative assignment is when, rather than determining the best route for each truck in an egotistical manner (inconsiderate of the other trucks), the best route for a group of trucks is determined. For example, the system may review the costs for trucks A, B, and C. Rather than simply choosing the route for truck A that is least expensive, the system will determine the best routes for trucks A, B, and C cooperatively. While the route chosen for truck A may not be the least expensive on an individual basis, the overall routes chosen for all of the trucks under consideration will be more economical. The optimal truck assignments are then stored in the pre-fetched assignment database 230 (step 650).

Assign Equipment: This process is used to assign a particular route to a particular vehicle, and is a real-time process. This process may be invoked by mining operations, or preferably, is invoked by an event occurring in the mine. For example, this process may be invoked for each vehicle after the particular vehicle has delivered its load. Alternatively, this process may be invoked when optimization criteria, production requirements, or the mining environment change. For example, the Assign Equipment process may be invoked as to all affected trucks when a particular shovel or processing site breaks down.

Figure 7:
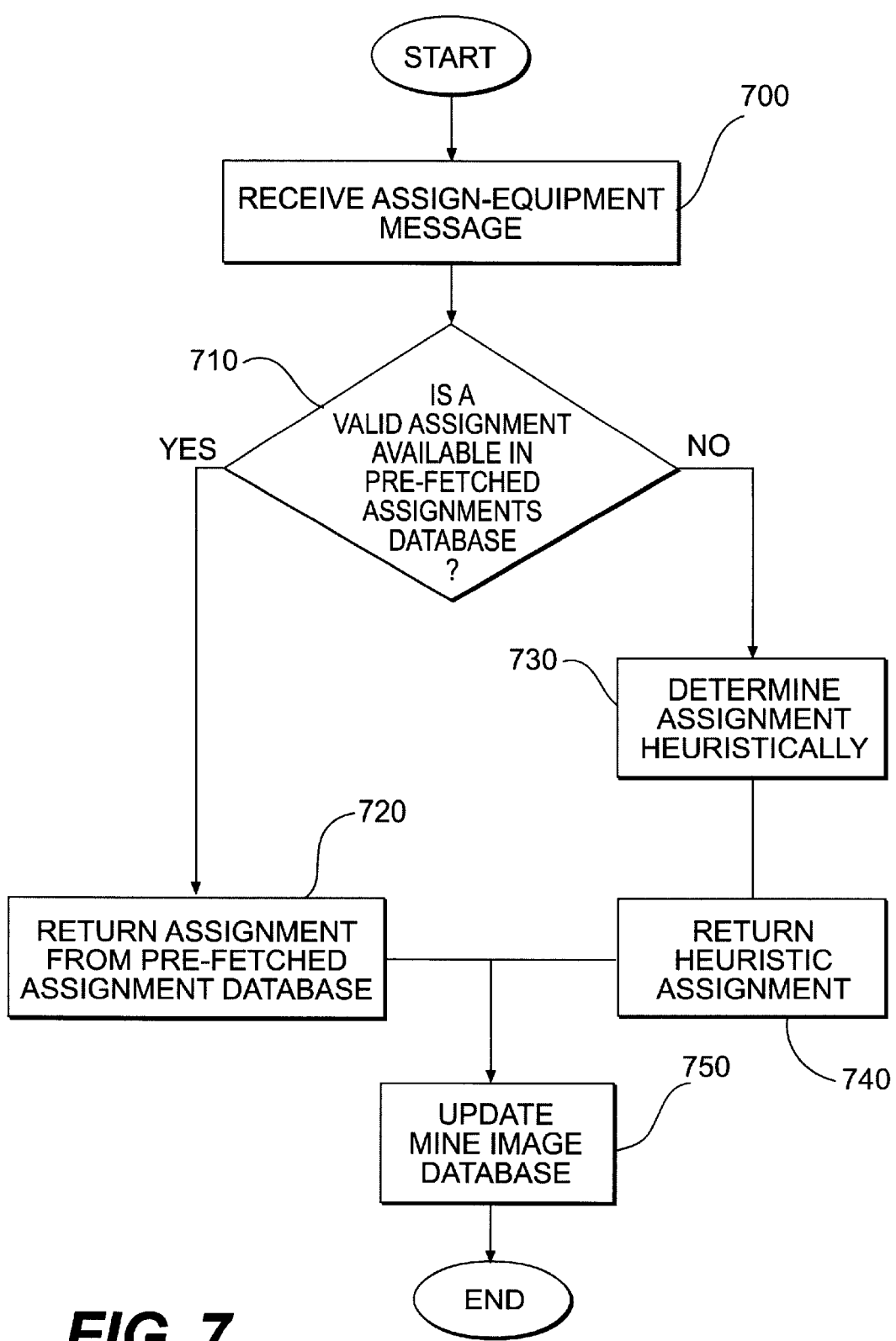
FIG. 7 is an exemplary flow chart of the "Assign Equipment" process performed by the base computer, consistent with one embodiment of the present invention.

As shown in FIG. 7, processor 200 receives an Assign_Equipment message (700). This message may be received from on-board computer 102, shovel monitoring system 112, processing site monitoring system 122, or mining operations, as described above. Processor 200 then determines whether a valid assignment is available in the pre-fetched assignments database 230 for the particular vehicle (step 710). If a valid assignment is available, processor 200 retrieves the pre-fetched assignment from pre-fetched assignments database 230 and sends the assignment to the vehicle (step 720). If a valid assignment is not available, an assignment is determined in real-time (step 730). This real-time assignment provides an alternative problem-solving technique for quickly determining an assignment. In particular, the real-time assignment may be determined heuristically, using rules of thumb rather than complex mathematics. For example, one heuristic rule might be to send each vehicle to the geographically-nearest source or processing site if no pre-fetched assignment is available. This heuristic, real-time assignment is then sent to the vehicle (740). Regardless of whether a pre-fetched assignment or a heuristic assignment is sent to the vehicle, mine image database 240 is updated to reflect the current status and route of the vehicle (step 750).

Processing memory 210 may include instructions for performing other tasks associated with truck assignment, such as a manual override process or additional processes for updating the mine image database 240 to include data from on-board computer 102, shovel monitoring system 112, or processing site monitoring system 122. This data may include the material type processed by the shovel or processing site, the estimated arrival time of a vehicle at either a shovel or processing site, or the break-down or start-up of a shovel or processing site. Further, this data may also be in the form of differential updates, so as to permit faster and simpler updates in the case of minor modifications.

INDUSTRIAL APPLICABILITY

A system and method are provided to reduce costs associated with material transport in a mine by optimizing to one or more specified guidelines, such as maximizing production or minimizing truck idle time, and providing dispatch instructions in accordance with the optimized system. For example, a mine may include a plurality of trucks, shovels (or loading sites), and processing sites, such as crusher machines. Each truck proceeds to a shovel and picks up a load of ore. The truck then continues to a processing site, where the ore is delivered, and the truck can then restart the cycle by proceeding to a shovel. In order to optimize material transport, the truck is directed to a shovel or processing site based on the system guidelines. If, for example, one of the guidelines is to minimize truck idle time, the truck would be directed to a shovel where the truck would have little or no waiting time before picking up the load of ore. In addition to minimizing truck idle time, truck service time and/or truck travel time may also be considered. Similarly, one guideline may be to minimize the length of the path traveled by a truck. Alternatively, if one of the guidelines is to obtain a target blend of ore, the truck may be directed to a shovel where a certain type of ore may be obtained and then further directed to a crusher machine, wherein the total delivery of ore to the crusher machine may produce a target blend of ore.

Additional factors may also be considered in the optimization process. These factors may be applied to the pre-fetched routes, prior to the determination of the cost of each of these routes. If the factors are not met by the pre-fetched routes, the route may either be discarded from further consideratrion or may be given a greater cost than a route that meets the factors. Following the consideration of these factors, cost analysis is applied to the remaining routes and the best route is chosen, possibly using cooperative assignment methods. For example, exemplary factors may include ensuring that a particular vehicle is sent to a shovel or processing site that is compatible with the vehicle. Further, priority of materials may also be considered, such that the system is optimized so that priority materials are saturated (or processed to the fullest extent) before non-priority materials. Similarly, the system and method may be optimized to keep the greatest number of shovels saturated (or processing to a threshold extent as determined by the mine operators). If it is known when a particular shovel or processing site will be going off-line for planned maintenance, the system and method may discontinue sending vehicles to the shovel or processing site prior to the planned outage, such that the last vehicle at the shovel or processing site leaves prior to the outage. Similarly, when a particular shovel or processing site is known to be coming back on-line, the system and method may begin sending trucks to the shovel or processing site so that the first truck is there when the shovel or processing site comes on-line.

Furthermore, the system and method may include parameters regarding truck operations in determining truck assignments. One exemplary parameter includes turn-around restrictions. The system and method may include rules to either allow or disallow an assignment that would require a truck to turn-around at the next nearest cross road. Consideration of the time required for a truck to turn around may also be included in this parameter. Another exemplary parameter may permit one or more trucks to be locked into certain assignments or locations. These locks may either be absolute (meaning they cannot be changed without override) or may be provisional, in which case the lock may be changed in order to optimize another parameter. Similarly, another exemplary parameter may permit a truck to be barred, either absolutely or provisionally, from certain assignments or locations.

One or more factors for consideration and parameters may be combined, based on the goals of the mine operators. Further, the factors for consideration and parameters may include many other factors or parameters than those described above. For example, other factors and parameters may include limiting the length of queues at processing sites or shovels or including predetermined assignments to send trucks to parking or fueling stations at predetermined intervals.

By determining truck assignments while considering the future state of the mine, it is possible to use traditional problem-solving methods that are time-consuming. The criteria considered by the problem-solving methods may be updated to reflect the current state of the mine or the goals to be achieved. These truck assignments are then stored, and may be provided to the vehicles in real-time. Further, the system includes a real-time heuristic process for providing truck assignments when none are available. Because the system considers a set of trucks, it is possible to further reduce the costs associated with material transport because the trucks can act cooperatively to provide the most cost-effective material transportation for the system as a whole, rather than for individual vehicles.

While the disclosed embodiment utilizes trucks in a mining environment, the system and method described herein have utility in other environments where dispatch instructions are provided to a plurality of vehicles (of all possible types) traveling between sites. Such other possible applications include, for example, moving products, either by vehicle or multi-route conveyor system, between various assembly line segments in a large scale manufacturing environment or conventional shipping environments.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A system for providing dispatch assignments, the system comprising:
   a plurality of vehicles;
   a plurality of sources;
   a plurality of processing sites; and
   a base computer,
   wherein the base computer is configured to provide dispatch information to individual vehicles based upon a cooperative assignment of multiple vehicles within the plurality of vehicles, and
   wherein the base computer includes:
      a processor;
      a process memory including instructions used by the processor;
      a configuration database;
      a pre-fetched assignment database; and
      a mine image database,
      wherein the configuration database, the pre-fetched assignment database, and the mine image database are each operably connected to the processor.

2. The system of claim 1, wherein the process memory is configured with instructions for performing at least one of the following procedures: set the configuration database, retrieve information from the configuration database, determine default dispatch assignments, determine pre-fetch assignments, assign a particular vehicle, override the assignment of a vehicle, or update the mine image database.

3. A system for providing dispatch assignments, the system comprising:
   a plurality of vehicles;
   a plurality of sources;
   a plurality of processing sites; and
   a base computer, the base computer configured to provide dispatch information to individual vehicles based upon a cooperative assignment of multiple vehicles within the plurality of vehicles,
   wherein each vehicle further receives instructions to proceed to one of the plurality of sources or one of the plurality of processing sites based upon anticipated future system conditions.

4. A method for providing dispatch assignments to a plurality of vehicles in an environment including a plurality of sources and a plurality of processing sites, the method comprising:
   obtaining current information about the environment;
   obtaining information about optimal criteria;
   determining, based on the current environment and optimal criteria information, a production plan;
   determining a plurality of possible dispatch assignments for each vehicle based on the production plan;
   determining costs associated with each possible dispatch assignment; and
   selecting from among the possible dispatch assignments, for each of the plurality of vehicles, a dispatch assignment based on a consideration of a cooperative assignment of multiple vehicles within the plurality of vehicles.

5. The method of claim 4, wherein the step of selecting from among the possible dispatch assignments includes:
   selecting from among the possible dispatch assignments based on anticipated future conditions of the environment.

6. The method of claim 4, further including the step of:
   storing the selected dispatch assignments in a database.

7. The method of claim 6, further including the steps of:
   receiving a request for an assignment associated with a particular vehicle;
   providing to the vehicle, if available, a stored dispatch assignment for the particular vehicle from the database; and
   providing a heuristically-determined dispatch assignment to the vehicle if a stored dispatch assignment is not available.

8. The method of claim 4, wherein the information about the environment includes at least one of the following: source location, processing site location, routes between sources and processing sites, types of materials available at each source, types of material available at each processing site, sources not in operation, or processing sites not in operation.

9. The method of claim 4, wherein the information about the optimal criteria includes at least one of the following: production requirements, blending requirements, or minimal idle time for vehicles.

10. The method of claim 4, further including:
    determining a default assignment for each vehicle.

11. The method of claim 10, wherein the step of determining a default assignment for each vehicle includes:
   determining a route for each vehicle to get into the determined default assignment for that vehicle.

12. The method of claim 4, wherein the optimal criteria information is provided by the mine operator.

13. The method of claim 4, wherein the current information about the environment is obtained at regular intervals.

14. A computer-readable medium including instructions for performing a method for providing dispatch assignments to a plurality of vehicles in an environment including a plurality of sources and a plurality of processing sites, the method comprising:
   obtaining current information about the environment;
   obtaining information about optimal criteria;
   determining, based on the current environment and optimal criteria information, a production plan;
   determining a plurality of possible dispatch assignments for each vehicle based on the production plan;
   determining costs associated with each possible dispatch assignment; and selecting from among the possible dispatch assignments, for each of the plurality of vehicles, a dispatch assignment based on a consideration of a cooperative assignment of multiple vehicles within the plurality of vehicles.

15. The computer readable medium of claim 14, wherein the step of selecting from among the possible dispatch assignments includes:
   selecting from among the possible dispatch assignments based on anticipated future conditions of the environment.

16. The computer readable medium of claim 14, further including the step of:
   storing the selected dispatch assignments in a database.

17. The computer readable medium of claim 16, further including the steps of:
   receiving a request for an assignment associated with a particular vehicle;
   providing to the vehicle, if available, a stored dispatch assignment for the particular vehicle from the database; and
   providing a heuristically-determined dispatch assignment to the vehicle if a stored dispatch assignment is not available.

18. The computer readable medium of claim 14, wherein the information about the environment includes at least one of the following: source location, processing site location, routes between sources and processing sites, types of materials available at each source, types of material available at each processing site, sources not in operation, or processing sites not in operation.

19. The computer readable medium of claim 14, wherein the information about the optimal criteria includes at least one of the following: production requirements, blending requirements, or minimal idle time for vehicles.

20. The computer readable medium of claim 14, further including:
   determining a default assignment for each vehicle.

21. The computer readable medium of claim 20, wherein the step of determining a default assignment for each vehicle includes:
   determining a route for each vehicle to get into the determined default assignment for that vehicle.

22. The computer readable medium of claim 14, wherein the optimal criteria information is provided by the mine operator.

23. A system for providing dispatch assignments within an environment, the system comprising:
   a plurality of vehicles;
   a plurality of sources;
   a plurality of processing sites; and
   a base computer, wherein the base computer is configured to provide dispatch information to the plurality of vehicles based upon anticipated future environment conditions.

24. The system of claim 23, wherein the base computer includes:
   a processor;
   a process memory including instructions used by the processor;
   a configuration database;
   a pre-fetched assignment database; and
   a mine image database,
   wherein the configuration database, the pre-fetched assignment database, and the mine image database are each operably connected to the processor.

25. The system of claim 24, wherein the process memory is configured with instructions for performing at least one of the following methods: set the configuration database, retrieve information from the configuration database, determine default dispatch assignments, determine pre-fetch assignments, assign a particular vehicle, override the assignment of a vehicle, or update the mine image database.

26. The system of claim 23, wherein each vehicle further receives dispatch instructions based upon a consideration of a cooperative assignment of the plurality of vehicles.

27. A method for providing dispatch assignments to a plurality of vehicles in an environment including a plurality of sources and a plurality of processing sites, the method comprising:
   obtaining current information about the environment;
   obtaining anticipated future information about the environment;
   obtaining information about optimal criteria;
   determining, based on the current environment and optimal criteria information, a production plan;
   determining a plurality of possible dispatch assignments for each vehicle based on the production plan;
   determining costs associated with each possible dispatch assignment; and
   selecting from among the possible dispatch assignments, for each of the plurality of vehicles, a dispatch assignment based on the production plan and anticipated future environment conditions.

28. The method of claim 27, wherein the step of selecting from among the possible dispatch assignments includes:
   selecting from among the possible dispatch assignments based on a consideration of a cooperative assignment of multiple vehicles within the plurality of vehicles.

29. The method of claim 27, further including the step of:
   storing the selected dispatch assignments in a database.

30. The method of claim 29, further including the steps of:
   receiving a request for an assignment associated with a particular vehicle;
   providing to the vehicle, if available, a stored dispatch assignment for the particular vehicle from the database; and
   providing a heuristically-determined dispatch assignment to the vehicle if a stored dispatch assignment is not available.

31. The method of claim 27, wherein the information about the environment includes at least one of the following: source location, processing site location, routes between sources and processing sites, types of materials available at each source, types of material available at each processing site, sources not in operation, or processing sites not in operation.

32. The method of claim 27, wherein the information about the optimal criteria includes at least one of the following: production requirements, blending requirements, or minimal idle time for vehicles.

33. The method of claim 27, further including:
determining a default assignment for each vehicle.

34. The method of claim 33, wherein the step of determining a default assignment for each vehicle includes:
determining a route for each vehicle to get into the determined default assignment for that vehicle.

35. The method of claim 27, wherein the optimal criteria information is provided by the mine operator.

36. The method of claim 27, wherein the current information about the environment is obtained at regular intervals.

37. A computer-readable medium including instructions for performing a method for providing dispatch assignments to a plurality of vehicles in an environment including a plurality of sources and a plurality of processing sites, the method comprising:
obtaining current information about the environment;
obtaining anticipated future information about the environment;
obtaining information about optimal criteria;
determining, based on the current environment and optimal criteria information, a production plan;
determining a plurality of possible dispatch assignments for each vehicle based on the production plan;
determining costs associated with each possible dispatch assignment; and
selecting from among the possible dispatch assignments, for each of the plurality of vehicles, a dispatch assignment based on the production plan and anticipated future environment conditions.

38. The computer readable medium of claim 37, wherein the step of selecting from among the possible dispatch assignments includes:
selecting from among the possible dispatch assignments based on consideration of a cooperative assignment of multiple vehicles within the plurality of vehicles.

39. The computer readable medium of claim 37, further including the step of:
storing the selected dispatch assignments in a database.

40. The computer readable medium of claim 39, further including the steps of:
receiving a request for an assignment associated with a particular vehicle;
providing to the vehicle, if available, a stored dispatch assignment for the particular vehicle from the database; and
providing a heuristically-determined dispatch assignment to the vehicle if a stored dispatch assignment is not available.

41. The computer readable medium of claim 37, wherein the information about the environment includes at least one of the following: source location, processing site location, routes between sources and processing sites, types of materials available at each source, types of material available at each processing site, sources not in operation, or processing sites not in operation.

42. The computer readable medium of claim 37, wherein the information about the optimal criteria includes at least one of the following: production requirements, blending requirements, or minimal idle time for vehicles.

43. The computer readable medium of claim 37, further including:
determining a default assignment for each vehicle.

44. The computer readable medium of claim 43, wherein the step of determining a default assignment for each vehicle includes:
determining a route for each vehicle to get into the determined default assignment for that vehicle.

45. The computer readable medium of claim 37, wherein the optimal criteria information is provided by the mine operator.

* * * * *